United States Patent [19]

Ford

[11] 4,303,059
[45] Dec. 1, 1981

[54] APPARATUS FOR SOLAR ENERGY COLLECTION

[75] Inventor: R. Gary Ford, Memphis, Tenn.

[73] Assignee: Energy Design Corporation, Memphis, Tenn.

[21] Appl. No.: 72,823

[22] Filed: Sep. 6, 1979

[51] Int. Cl.³ .............................................. F24J 3/02
[52] U.S. Cl. ................................... 126/438; 126/443
[58] Field of Search ............................... 126/438, 443

[56] References Cited

U.S. PATENT DOCUMENTS

| | | | |
|---|---|---|---|
| 2,907,318 | 10/1959 | Awot | 126/438 |
| 4,120,285 | 10/1978 | Nugent | 126/443 |
| 4,184,895 | 1/1980 | Oster, Jr. | 126/438 |
| 4,198,955 | 4/1980 | Dorbeck | 126/438 |

Primary Examiner—Larry I. Schwartz
Attorney, Agent, or Firm—Martin Novack

[57] ABSTRACT

The disclosure is directed to an apparatus for collecting solar energy. A housing is provided with an open top, and a solar radiation-transmissive cover is removably mounted on the top of the housing. A plurality of elongated open-ended troughs are mounted side-by-side in the housing, the troughs having reflective inner surfaces. A fluid-carrying tube system is provided, and has a plurality of branches which respectively extend along each trough near the bottom thereof. A pair of end panel assemblies are mounted in the housing at opposing ends of the row of troughs and form the ends of the troughs. Each of the end panel assemblies includes adjacent elongated upper and lower end panels which are removably coupled to each other and have a common elongated edge. The surface of each of the upper end panels which faces the troughs is reflective of solar radiation. Preferably, the surface of each of the lower end panels which faces the troughs is also reflective of solar energy. In accordance with a feature of the disclosed apparatus, each of the upper and lower end panels has a semicircular aperture at the common edge so as to form a circular aperture at about the lateral center of each trough. The fluid tube branches extend through the apertures of one of the end panel assemblies. A plurality of elongated cylindrical evacuated tubes are provided, each having a hollow core proportioned to fit over a respective branch of the fluid-carrying tube system. The opposing ends of each evacuated tube are supported in the apertures of the end panel assembly of the respective trough.

18 Claims, 6 Drawing Figures

APPARATUS FOR SOLAR ENERGY COLLECTION

BACKGROUND OF THE INVENTION

This invention relates to the field of solar energy and, more particularly, to an improved solar energy collecting apparatus.

The idea of collecting energy from the sun's rays and converting it to useful thermal or other energy is quite old. In the past decade, however, the increasing cost of energy and recognition of the limited supply of fossil fuel have led to the development of innumerable schemes for solar energy collection. One type of solar energy collection device which has been developed in many forms is the so-called "evacuated tube solar collector". An early example of this type of device is disclosed in the U.S. Pat. No. 980,505 which issued in 1911. Other examples are set forth in the U.S. Pat. Nos. 1,946,184; 2,133,649; 3,125,091; and 3,227,153.

A simple form of an evacuated-tube solar collector consists of a fluid-carrying pipe and a hollow cylindrical transparent glass tube which surrounds the pipe and is spaced therefrom. A solar energy absorbing medium is typically coupled to the pipe, the simplest form of absorbing medium being a black coating applied to the pipe's outer surface. The space between the pipe and the glass enclosure is evacuated to leave a partial vacuum therein. In operation, solar energy passes through the glass and is absorbed by the black pipe. Fluid is circulated through the pipe to remove the heat for use as desired. Wavelength selective absorber coatings can minimize radiation heat losses. The vacuum region minimizes heat loss from the pipe that would otherwise occur by convection and conduction. An alternate known configuration of a vacuum tube solar collector is the "thermos bottle" type. In this collector a concentric pair of nested glass tubes is employed, the ends being sealed separately on one end and annularly joined at the other, with the resultant annular volume in the space between being evacuated. The outer tube is left transparent and the inner tube has a solar absorbing coating applied to the outside surface.

In a typical evacuated-tube solar collection installation, a plurality of side-by-side evacuated tube units are employed in conjunction with a plumbing system which circulates the heat transport fluid (e.g. water or air) through the pipes contained in the glass tubes. Various designs have been set forth which place the evacuated tube collectors at the foci of light concentrators so that the total light flux impinging upon the absorber is increased. This technique reduces the absorbing surface area in relation to the radiation collection area, in order to reduce heat losses per unit of collection area. For example, a pair of opposing concave or flat mirrorized structures can be positioned adjacent and above each evacuated tube collector, forming a vee, with the tube receiver at the apex. In this manner, solar radiation that would normally hit the region between the spaced evacuated-tube collectors can be directed, with reasonable precision, toward the absorber of an evacuated-tube collector. This can result in improved efficiency due to lowered heat losses, and in reduced cost, as less expensive reflectors are substituted for more expensive evacuated tubes. Imaging or nonimaging reflectors can be employed to derive these advantages. An example of an imaging reflector optically coupled to an evacuated tube absorber is the sun tracking parabolic trough. In this configuration, the absorber is precisely located at the foci, whose location depends upon the particular reflector design used. Although concentration is frequently desirable, in certain instances it is not, in which case other types of reflectors, such as involutes of the absorbers, can be employed.

It is thus well recognized that the combination of reflectors and evacuated tube collectors can provide a desirable solar heat collection system. However, such systems can tend to be large and bulky, and expensive to fabricate and use. To insure the cost-effectiveness of an installation, the solar collection system should not be unduly expensive to manufacture, install, or maintain. An object of the present invention is to provide a solar collection apparatus which meets these criteria while also providing efficient and reliable operation.

SUMMARY OF THE INVENTION

The present invention is directed to an improved apparatus for collecting solar energy. A housing is provided with an open top, and a solar radiation-transmissive cover is removably mounted on the top of the housing. A plurality of elongated open-ended troughs are mounted side-by-side in the housing, the troughs having solar radiation-reflective inner surfaces. A fluid-carrying tube system is provided, and has a plurality of branches which respectively extend along each trough near the bottom thereof. The branches are preferably hairpin-shaped. A pair of end panel assemblies are mounted in the housing at opposing ends of the row of troughs and form the ends of the troughs. Each of the end panel assemblies includes adjacent elongated upper and lower end panels which are removably coupled to each other and have a common elongated edge. The surface of each of the upper end panels which faces the troughs is reflective of solar radiation. Preferably, the surface of each of the lower end panels which faces the troughs is also reflective of solar energy. In accordance with a feature of the invention, each of the upper and lower end panels has a semicircular aperture at the common edge so as to form a circular aperture at about the lateral center of each trough. The fluid tube branches extend through the apertures of one of the end panel assemblies. A plurality of elongated cylindrical evacuated tubes are provided, each having a hollow core proportioned to fit a respective branch of the fluid-carrying tube system. The opposing ends of each evacuated tube are supported in the apertures of the end panel assembly of the respective trough.

In the preferred embodiment of the invention, a rim of resilient material is coupled to the periphery of each of the circular apertures. Also, in this embodiment the lower end panels include a flange which serves as a shelf to support the ends of the troughs.

The solar collector apparatus of the present invention has advantages from the standpoints of manufacturing ease, reliability, and maintainability. From a manufacturing standpoint, the defined structure can be simply and readily assembled with a minimum of parts and without undue handling of breakable evacuated tubes which are conveniently mounted over the fluid tubes toward the end of the assembly operation. The two-piece end panel assemblies serve to support the reflective troughs and to resiliently support the evacuated tubes. They further serve as stiffening ribs for the housing and function operationally as end reflectors for the troughs. In an embodiment of the invention, which has two rows of troughs, a central pair of end panels also constitute a manifold which contains the stem of a fluid tube system that branches out into both rows of troughs. The manifold holds insulation for the fluid tube stems. The reliability of operation of the apparatus is enhanced by the fact that the fluid-carrying tube system can be formed from continuous metal tubing which is not sealed to glass surfaces. Operation at only slightly decreased efficiency can continue even after breakage of one or more of the evacuated tube units. The metal tubing fully contains from spillage the working fluid in the event a glass vacuum tube should break. Further, the metal tubing is able to withstand the high pressures exerted by fluids at high temperatures. From the standpoint of maintainability, there is particular advantage to the invented structure. To change an evacuated tube, all that is necessary is to remove the weathercover and the upper end panel of the outer end panel assembly. One or more evacuated tubes can then be slid off its respective branch of the fluid-carrying tube system and a replacement slid back over the fluid tube branch. It is not necessary to drain the fluid system or to remove or replace complicated mounts or seals.

Further features and advantages of the invention will become more readily apparent from the following detailed description when taken in conjunction with the accompanying drawings.

DESCRIPTION OF THE PREFERRED EMBODIMENT

Figure 1:
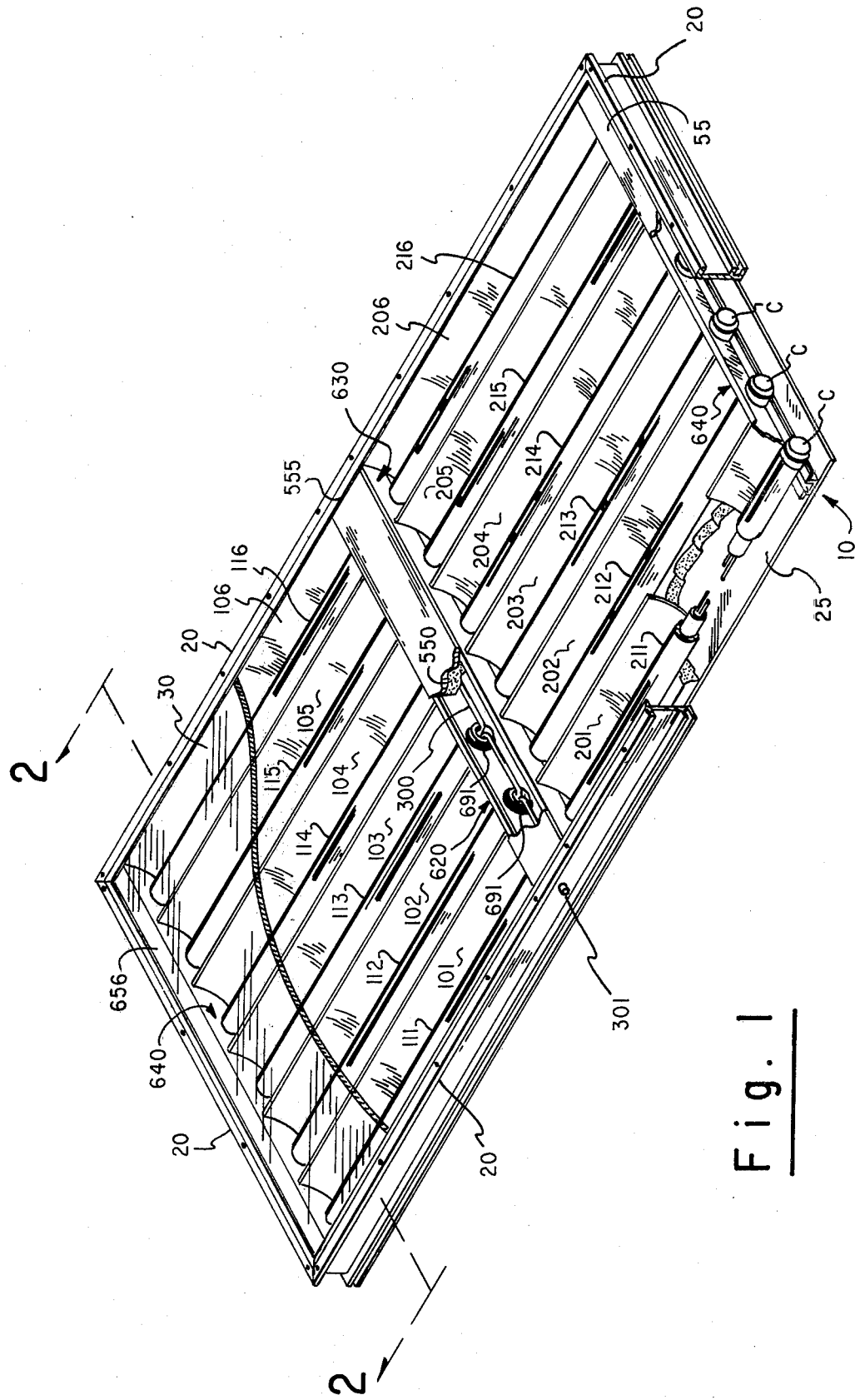
FIG. 1 is an elevational perspective view, partially broken away, of an embodiment of an apparatus in accordance with the invention.

Referring to FIG. 1, there is shown an embodiment of a solar collection apparatus in accordance with the invention. A generally rectangular housing 10 is formed by a four-sided frame 20 which is welded at its corners and also welded to a sheet metal bottom 25. A high transmissivity tempered glass sheet 30 is mounted in the top of the frame and serves as a protective weather cover for the housing. In the present embodiment of the apparatus, there are twelve individual solar collection units, each including a reflective concentrating trough, an evacuated glass tube having an inner absorber, and a fluid-carrying branch for carrying a heat transfer fluid. More particularly, there is provided a left array of six side-by-side reflective troughs 101 through 106, and a right array of six side-by-side reflective troughs 201 through 206. Extending along the bottom of each trough is a branch of a fluid-carrying tube system 300 which is covered by an evacuated glass tube that contains a solar radiation absorber. The six evacuated tubes of the left array are designated 111 through 116, and the six evacuated tubes of the right array are designated 211 through 216.

Figure 3:
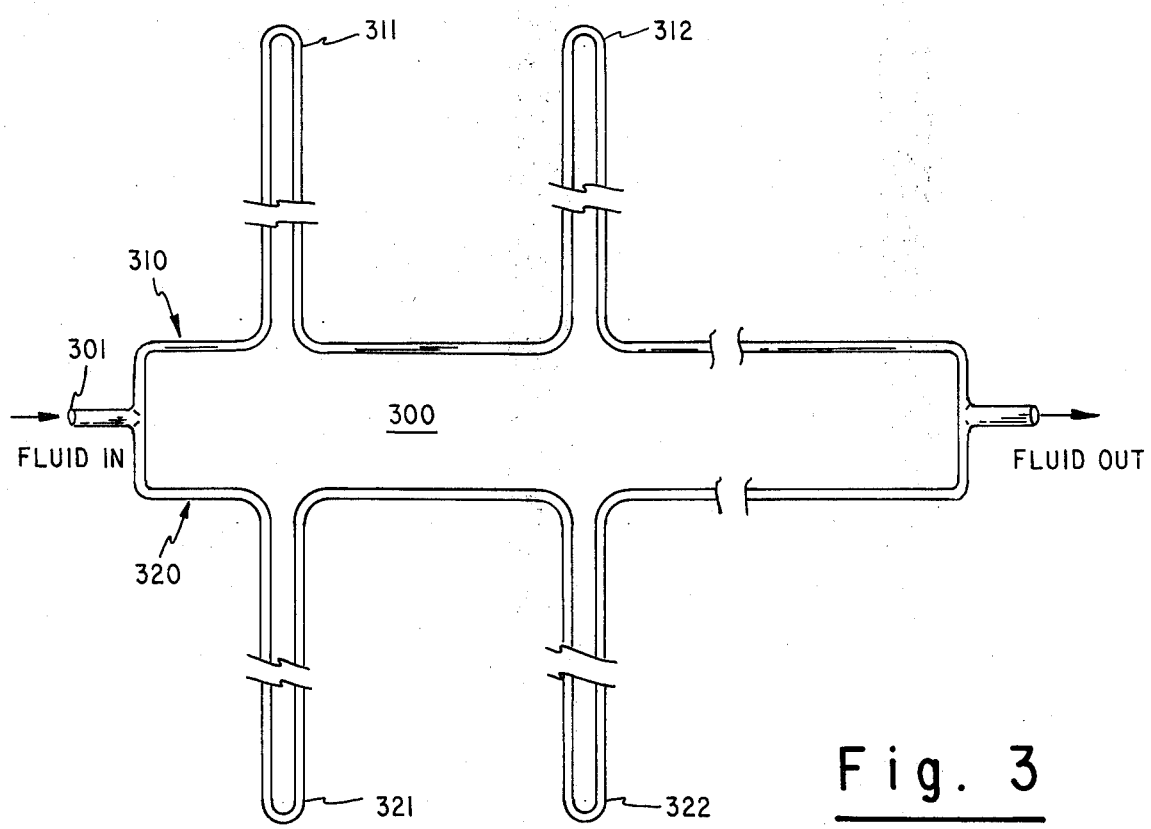
FIG. 3 illustrates the fluid-carrying tube system of the FIG. 1 embodiment.

The fluid-carrying system 300 of the present embodiment, illustrated separately in FIG. 3, includes two continuous metal tube stems 310 and 311, each having six hairpin shaped branches 311, 312 . . . , and 321, 322 . . . , which extend along respective ones of the troughs, near the bottoms thereof. The stems of fluid-carrying tubes 311 and 312 extend through a central region, called the manifold 500, of the apparatus, this region preferably being filled with a suitable insulation 550. The inlet ends of the fluid-carrying tube stem are joined and coupled through the frame of housing 20 through a pipe connection 301. The outlet ends of the tube stems are also joined and coupled through the frame housing through a pipe connection 302.

Figure 2:
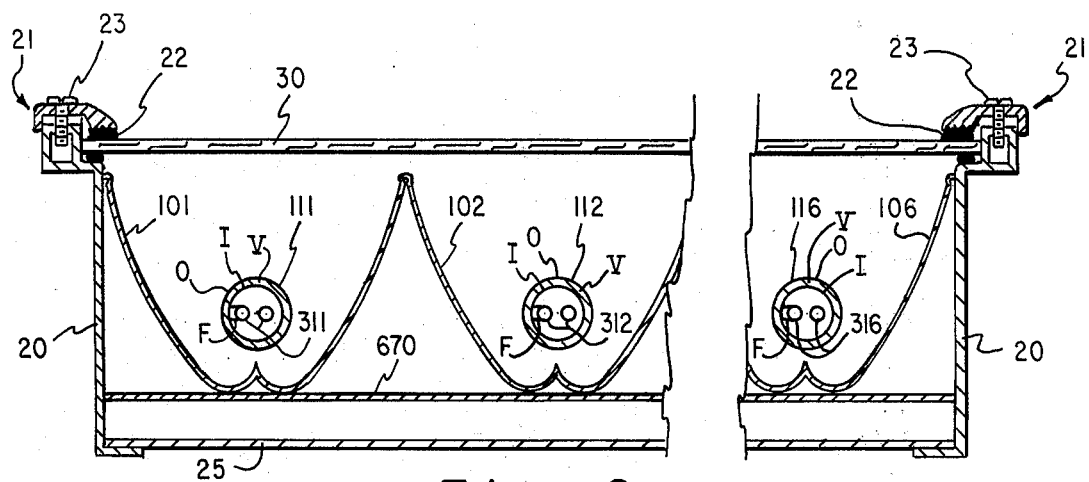
FIG. 2 is a cross-sectional view, taken through a section defined by arrows 2—2 of FIG. 1.

The troughs, which are reflective of solar radiation, are better illustrated in the cross-section of FIG. 2. In the present embodiment the six adjacent troughs are each preferably formed in the shape of an involute of the cylindrical absorber within their respective evacuated tubes. The involute also has extended sidewalls which result in a moderate concentration ratio of about 1.3:1. Each trough is formed of sheet aluminum and has a curved coupling lip at the top edges thereof which facilitates the fastening of adjacent troughs to each other. The inner surface of the troughs is rendered reflective of solar radiation by electropolishing the metal surface thereof and then providing a clear protective coating. Alternatively, other reflective or mirrored surfaces can be applied as coatings or films. As defined herein, the term "reflective of solar radiation," when applied to the troughs and end panels, is intended to mean a surface which is at least 60% percent reflective of most wavelengths of solar radiation. Preferably, however, the surface should be at least 75% percent reflective of most wavelengths of solar radiation. The frame side walls include a clamp 21 at the top thereof for securing the weather cover 30 via a gasket 22. The clamp is secured by a number of screws 23 which are spaced around the frame.

The troughs themselves are formed open-ended. However, two pairs of end panel assemblies, 610 and 620 for the left array, and 630 and 640 for the right array, are mounted on the housing bottom at opposing ends of the two rows of troughs, and form the ends of the troughs.

Figure 4:
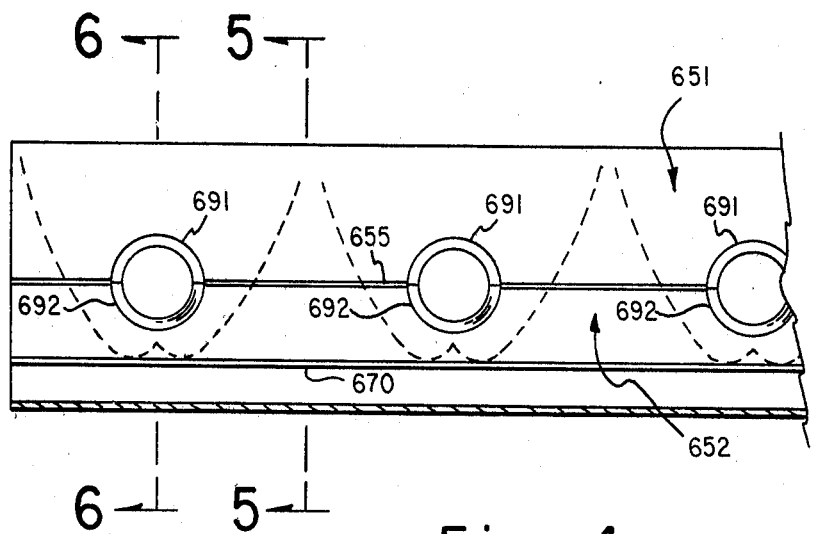
FIG. 4 illustrates one of the end panel assemblies of the FIG. 1 embodiment.
Figures 5, 6:
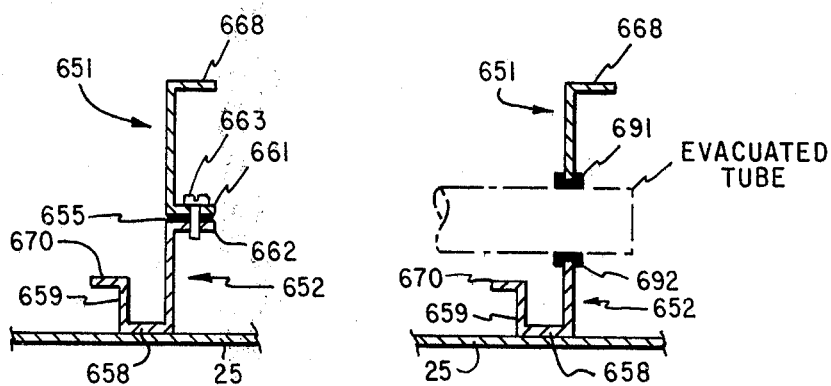
FIG. 5 is a cross-sectional view of an end panel assembly as taken through a section defined by arrows 5—5 of FIG. 4.
FIG. 6 is a cross-sectional view of an end panel assembly as taken through a section defined by arrows 6—6 of FIG. 4.

Referring to FIGS. 4, 5, and 6 there is shown in further detail the structure of one of the end panel assemblies. Each end panel assembly includes an upper elongated end panel 651 and a lower elongated end panel 652. The upper and lower end panels are joined at a common edge 655 at which each has a flat rim (661 and 662), these rims being joined by fasteners 663 which are readily removed and/or refastened. At the top edge of the upper end panel 651 is formed another flat rim 668 which serves to support either a manifold cover 555 (FIG. 1) or an edge cover plate 556 or 557 (FIG. 1), depending upon which end panel assembly is involved.

Each of the lower end panels 652 is formed with a base or stand 658 at the bottom thereof, the stand having a frontal portion 659 which extends upward and then outward to form a shelf 670. The bottom of stand 658 is welded to the bottom 25 of housing 10. In this manner, lower end panels are secured at appropriate positions in the housing and they, in turn, serve as strengthening ribs which enhance the structural integrity of the housing. The ends of the reflective troughs are supported on the shelf 670, as illustrated by the representative troughs shown in dashed line in FIG. 4.

At positions corresponding to the lateral centers of the troughs, each end panel assembly has a circular aperture proportioned to receive and hold an end of a respective evacuated tube. As seen in FIGS. 1 and 4, the circular apertures in each end panel assembly are formed by providing semicircular apertures at appropriate positions along the edge 655 of the upper and lower end panels to obtain the desired resultant circular apertures when the upper and lower end panels are joined to form the end panel assemblies. Around the periphery of each semicircular aperture is a semicircular grommet, designated in the drawings by reference numerals 691 and 692. The grommets serve as resilient support surfaces for the evacuated tubes to cushion them and reduce the possibility of breakage.

In FIG. 2 the representative evacuated tubes 111, 112 and 116 are illustrated as having inner and outer glass cylinders I and O, respectively, which are joined at one end of the tubes and have a vacuum in the region V therebetween. The inner glass tube has a dark absorbing coating thereon. Evacuated tubes of the type described are available commercially, for example, from General Electric Corp. or from Owens Illinois Corp. As seen in FIG. 2 and as is known in the art, a metal heat transfer fin, F, can be employed to transfer heat absorbed by the absorber surface on the inner glass to the fluid tube branches 311, 311 ... 316 from which it is transferred to the fluid. The evacuated tubes are sealed at one end and have a protective rubber or plastic cap, C, at that end, as seen in FIG. 1. The other end of the tubes have opened cores, as can also be seen in FIG. 1 by observing the ends of tubes 112 and 113 in the manifold region.

When assembling the apparatus of the present embodiment, the reflective troughs are seated on the shelves of the lower end panels, and the stems of the fluid carrying system are placed in the manifold region with the branches thereof extending through the apertures of the lower end panels to lie along the trough bottoms. The evacuated tubes and the associated heat transfer fins can readily be slid over the fluid tube branches so that the opposing ends of each evacuated tube are seated in the semicircular grommets of opposing lower end panels. The branches of the fluid coupling system are relatively long and therefore have enough "play" to be pivoted slightly upward so that the tubes can be readily inserted thereon. With the evacuated tubes in place, the top end panels can be secured. When it is desired to access an evacuated tube, it is only necessary, after removal of the weather cover and edge cover plate, that the top end panel 610 or 640 be removed.

The end panel assemblies of the present invention provide multiple functions in the solar collection apparatus. These assemblies act as stiffening ribs which help to provide structural integrity to the unit housing. The end panel assemblies serve to support the ends of the evacuated tubes in a manner which minimizes the possibility of breakage and renders the tubes easily removable for maintenance or replacement. Each of the end panel assemblies also includes a shelf for support of the reflective troughs and a top rim for support of a manifold cover or end cover (the manifold region itself being defined by the two central end panel assemblies). Finally, from an operational standpoint, the end panel assemblies serve as end reflectors of the troughs to enhance overall operating efficiency.

The illustrated embodiment, wherein a single common manifold region is "shaped" by the two different rows of collectors, is considered to be most advantageous. In particular, heat losses from the manifold region are substantially reduced, as compared, for example, to a situation wherein the same number of collectors are arranged in one long row. Space is also conserved by using a single common manifold. Further, cost of manufacture is reduced using the disclosed configuration since less insulation and structural material is required for a common manifold region.

The invention has been described with reference to a particular embodiment, but variations within the spirit and scope of the invention will occur to those skilled in the art. For example, while it is preferred to use a pair of end panel assemblies in conjunction with each row of troughs, it will be understood that alternate means can be used for support at one end of each evacuated tube, such as a mounting clip coupled to the end of the evacuated tube. Further, it will be understood that the shape of the reflective troughs can be selected in accordance with a particular application and a desired operating temperature range. Also, any suitable absorber and/or heat extraction means can be employed consistent with the principles of the invention. For example, a gas such as air can be readily utilized as the working fluid in conjunction with an appropriately configured fluid circuit.

I claim:

1. Apparatus for collecting solar energy, comprising:
   a housing having an open top;
   a solar radiation-transmissive cover removably mounted on the top of said housing;
   a plurality of elongated open-ended troughs mounted side-by-side in said housing, said troughs having solar radiation-reflective inner surfaces;
   a fluid-carrying tube system having a plurality of branches which respectively extend along each trough near the bottom thereof;
   a pair of end panel assemblies mounted in said housing at opposing ends of said row of troughs and forming the ends of said troughs, each of said end panel assemblies including adjacent elongated upper and lower end panels which are removably coupled to each other and have a common elongated edge, the surface of each of said upper and lower end panels which faces said troughs being reflective of solar radiation, each of said upper and lower end panels having a semicircular aperture at the common edge so as to form a circular aperture at about the lateral center of each trough, said fluid tube branches extending through the apertures of one of said end panel assemblies, said lower end panels including a flange which serves as a shelf to support the ends of said troughs; and
   a plurality of elongated cylindrical evacuated tubes, each having a hollow core proportioned to removably fit over a respective branch of the fluid-carrying tube system, the opposing ends of each evacuated tube being supported in the apertures of the end panel assemblies of the respective trough.

2. Apparatus as defined by claim 1 further comprising a rim of resilient material coupled to the periphery of each of said semicircular apertures.

3. Apparatus as defined by claim 1 further comprising a plurality of solar radiation absorbers adapted for coupling with respective fluid tube branches.

4. Apparatus as defined by claim 1 wherein said evacuated tubes include an inner glass surface having an absorber disposed thereon, and further comprising a plurality of heat transfer fins coupleable between said absorber and respective fluid tube branches.

5. Apparatus as defined by claim 1 wherein each of said fluid tube branches is hairpin shaped.

6. Apparatus as defined by claim 2 wherein each of said fluid tube branches is hairpin shaped.

7. Apparatus as defined by claim 4 wherein each of said fluid tube branches is hairpin shaped.

8. Apparatus for collecting solar energy, comprising:
a housing having an open top;
a solar radiation-transmissive cover removably mounted on the top of said housing;
a first row of elongated open-ended troughs mounted side-by-side in said housing;
a second row of elongated open-ended troughs mounted side-by-side in said housing in spaced relation to said first row and with the troughs of said second row being generally aligned with the troughs of said first row;
each of said troughs having a reflective inner surface;
a fluid-carrying tube system having a stem which extends through the space between said first and second rows of troughs in transverse direction to the axes of said troughs, and a plurality of branches which respectively extend along each trough near the bottom thereof;
first and second pairs of end panel assemblies mounted in said housing at opposing ends of said rows of troughs and forming the ends of said troughs, each of said end panel assemblies comprising adjacent elongated upper and lower end panels which are removably coupled to each other and have a common elongated edge, the surface of each of said upper and lower end panels which faces said troughs being reflective of solar radiation, each of said upper and lower end panels having a semicircular aperture at the common edge so as to form a circular aperture at about the lateral center of each trough, said fluid tube branches extending through the apertures of one of each pair of end panel assemblies, said lower end panels including a flange which serves as a shelf to support the ends of said troughs; and
a plurality of elongated cylindrical evacuated tubes, each having a hollow core proportioned to removably fit over a respective branch of the fluid-carrying tube system, the opposing ends of each evacuated tube being supported in the apertures of the end panel assemblies of the respective trough.

9. Apparatus as defined by claim 8 further comprising a rim of resilient material coupled to the periphery of each of said semicircular apertures.

10. Apparatus as defined by claim 8 further comprising a plurality of solar radiation absorbers adapted for coupling with respective fluid tube branches.

11. Apparatus as defined by claim 9 further comprising a plurality of solar radiation absorbers adapted for coupling with respective fluid tube branches.

12. Apparatus as defined by claim 8 wherein said evacuated tubes include an inner glass surface having an absorber disposed thereon, and further comprising a plurality of heat transfer fins coupleable between said absorber and respective fluid tube branches.

13. Apparatus as defined by claim 8 wherein each of said fluid tube branches is hairpin shaped.

14. Apparatus as defined by claim 9 wherein each of said fluid tube branches is hairpin shaped.

15. Apparatus as defined by claim 12 wherein each of said fluid tube branches is hairpin shaped.

16. Apparatus as defined by claim 8 wherein said upper end panels include a top rim, and further comprising a manifold cover sheet supported on the top rims of the upper end panels which are adjacent the stem of said fluid-carrying tube system.

17. Apparatus as defined by claim 9 wherein said upper end panels include a top rim, and further comprising a manifold cover sheet supported on the top rims of the upper end panels which are adjacent the stem of said fluid-carrying tube sytem.

18. Apparatus as defined by claim 14 wherein said upper end panels include a top rim, and further comprising a manifold cover sheet supported on the top rims of the upper end panels which are adjacent the stem of said fluid-carrying tube system.

* * * * *